US012531195B2

(12) United States Patent
Williford et al.

(10) Patent No.: US 12,531,195 B2
(45) **Date of Patent: *Jan. 20, 2026**

(54) LOW IMPACT AUXILIARY SWITCH MECHANICALLY OPERATED CONTACTS (MOC) MECHANISM

(71) Applicant: Schneider Electric USA, Inc., Andover, MA (US)

(72) Inventors: Matthew Alan Williford, Nashville, TN (US); Sergio Flores, Smyrna, TN (US); Naveen Kumar Budnar Venkatesh, Bangalore (IN); David Price, Murfreesboro, TN (US); Manuel Guillermo Cader Valencia, Nashville, TN (US)

(73) Assignee: Schneider Electric USA, Inc., Boston, MA (US)

(*) Notice: Subject to any disclaimer, the term of this patent is extended or adjusted under 35 U.S.C. 154(b) by 190 days.

This patent is subject to a terminal disclaimer.

(21) Appl. No.: 18/213,989

(22) Filed: Jun. 26, 2023

(65) Prior Publication Data

US 2023/0335357 A1 Oct. 19, 2023

Related U.S. Application Data

(63) Continuation of application No. 17/554,203, filed on Dec. 17, 2021, now Pat. No. 11,715,612.

(Continued)

(51) Int. Cl.

*H01H 33/42* (2006.01)
*H01H 3/30* (2006.01)
*H01H 9/26* (2006.01)

(52) U.S. Cl.

CPC .............. *H01H 33/42* (2013.01); *H01H 3/30* (2013.01); *H01H 9/26* (2013.01)

(58) Field of Classification Search

CPC .. H01H 3/30; H01H 3/38; H01H 3/46; H01H 9/26; H01H 9/24; H01H 71/04; H01H 71/46; H01H 33/42; H01H 5/06

(Continued)

(56) References Cited

U.S. PATENT DOCUMENTS 3,301,984 A 1/1967 Wilson
3,569,652 A 3/1971 Hauser (Continued)

FOREIGN PATENT DOCUMENTS

EP 2605264 A1 6/2013
WO 2019239590 A1 12/2019

OTHER PUBLICATIONS

"Medium Voltage Circuit Breaker Course, Chapter 2.0, Student Manual, Circuit Breaker Mechanical Components and Operation", U.S. Nuclear Regulatory Commission, Rev. 0, 14 pages, accessed on the Internet at https://www.nrc.gov/docs/ML1123/ML11238A227.pdf on Nov. 23, 2020.

(Continued)

*Primary Examiner* — William A Bolton
(74) *Attorney, Agent, or Firm* — Wolf, Greenfield & Sacks, P.C.

(57) ABSTRACT

A crank arm of an auxiliary rotary switch in a circuit breaker changes electrical connections of contacts in the auxiliary rotary switch when the crank-arm is rotated about its axis. An auxiliary switch actuator decouples abrupt forces from being applied to the crank arm resulting from closing main contacts of the circuit breaker. In response to the main contacts starting to close, the crank arm is set into rotation by motion of a connection-state link that is coupled to the main contacts. The rotation of the crank arm continues up to a point at which the rotation is stopped, while the connection-state link continues its motion without being connected (Continued)

to the crank arm. In this manner, the connection-state link is decoupled from the crank arm, to relieve the crank arm from receiving the abrupt forces conducted by the connection-state link resulting from the main circuit breaker contacts closing.

17 Claims, 10 Drawing Sheets

Related U.S. Application Data

(60) Provisional application No. 63/131,396, filed on Dec. 29, 2020.

(58) Field of Classification Search
USPC .......................................... 200/400, 421, 442
See application file for complete search history.

(56) References Cited

U.S. PATENT DOCUMENTS

| | | | | |
|---|---|---|---|---|
| 3,600,540 | A | 8/1971 | Bould | |
| 3,689,720 | A | 9/1972 | Patel | |
| 3,773,995 | A | 11/1973 | Davies | |
| 3,832,504 | A | 8/1974 | Cellerini et al. | |
| 3,944,772 | A | 3/1976 | Davies | |
| 4,301,342 | A | 11/1981 | Castonguay et al. | |
| 4,743,876 | A * | 5/1988 | Milianowicz | H01H 83/12 335/173 |
| 5,113,056 | A * | 5/1992 | Kuhn | H01H 3/301 200/82 R |
| 5,901,838 | A * | 5/1999 | Nakatani | H01H 3/30 200/501 |
| 6,437,269 | B1 * | 8/2002 | Rakus | H01H 3/3015 200/400 |
| 6,472,627 | B1 * | 10/2002 | Yoon | H01H 3/30 218/154 |
| 7,186,937 | B1 | 3/2007 | Ricciuti et al. | |
| 2003/0034242 | A1 * | 2/2003 | Mori | H01H 3/3015 200/400 |
| 2021/0366674 | A1 | 11/2021 | Tanigaki et al. | |

OTHER PUBLICATIONS

Brown, Bill, "Design Guide", 257 pages, accessed on the Internet at https://www.se.com/us/en/partners/resources/design-guide/ on Nov. 23, 2020.

"HVX 12-17.5-24kV, Embedded pole vacuum circuit-breaker, Medium Voltage Switching Device", Technical Instruction No. AVXN007260202, Schneider Electric, 2011, 48 pages.

Extended European Search Report dated May 24, 2022 for corresponding European Patent Application No. 21218142.4-1201, 7 pages.

* cited by examiner

CONTACS OPEN

CONTACS CLOSING

CONTACS CLOSING

CONTACS
CLOSING

CONTACS CLOSED

CONTACS OPENING

CONTACS OPENING

CONTACS OPEN

TOP VIEW

LOW IMPACT AUXILIARY SWITCH MECHANICALLY OPERATED CONTACTS (MOC) MECHANISM

CROSS REFERENCE TO RELATED APPLICATIONS

This application is a continuation of U.S. application Ser. No. 17/554,203, filed on Dec. 17, 2021, which claims the benefit of and priority to U.S. Provisional Application No. 63/131,396, filed on Dec. 29, 2020 under 35 U.S.C. 119(e), which applications are incorporated by reference herein in their entirety.

TECHNICAL FIELD

The present disclosure relates to switch mechanisms for medium voltage electric equipment.

BACKGROUND

Medium voltage circuit breakers used in industrial and commercial applications, may have a rated maximum voltage of, for example, from 5 to 15 kV, a rated continuous current of, for example, from 1200 to 2000 Amperes, and a rated power frequency of, for example, 60 Hz. Medium voltage circuit breakers typically handle three-phase voltage systems and have line and load primary disconnects for each phase, which are heavy duty electrical connectors.

Medium voltage circuit breakers are designed to limit the peak magnitude of fault current that flows through them by opening within a AC first half-cycle after fault initiation, before the fault current has a chance to reach its peak value. This helps provide a degree of protection for downstream equipment that could otherwise be damaged by the magnetic or thermal effects produced by the high-level faults. When a fault is detected, the trip mechanism in the circuit breaker immediately releases spring energy of the main current carrying contacts of the circuit breaker to rapidly move apart, interrupting the main current.

To reduce the destructive effects of arcing on the main contacts, medium voltage circuit breakers are designed to rapidly close the main contacts by means of a closing spring that is compressed by a charging motor or manual charge handle to store mechanical energy. When the closing spring has been compressed to the charged position, a closing latch holds the closing spring in a fully compressed position. When a close button is pressed or a close coil is energized, the close latch is removed and the closing spring engages the closing linkage to abruptly force the contact arm to drive the main contacts together.

Auxiliary switches in the circuit breaker are mechanically coupled to the main contacts and change state when the main contacts change, to pass an indication of the state of the main contacts as being open or closed. In order to ensure that the electrical indication does not itself fail due to the interruption of the main current, the open/closed state of the main current carrying contacts is mechanically signaled to the auxiliary switches by a mechanical linkage to the main current carrying contacts.

In the previous designs, the force of rapidly opening and closing the main contacts would push directly into the auxiliary switch, which could cause damage to the switch.

What is needed is a mechanical mechanism for signaling the open or closed state of the main current carrying contacts to the auxiliary switches, which reduces the forces transmitted to the auxiliary switch.

SUMMARY

In accordance with one example embodiment described herein, a crank arm of an auxiliary rotary switch in a circuit breaker changes electrical connections of contacts in the auxiliary rotary switch when the crank-arm is rotated about its axis. An auxiliary switch actuator decouples abrupt forces from being applied to the crank arm resulting from closing the main contacts of the circuit breaker. In response to the main contacts starting to close, the crank arm is set into rotation by motion of a connection-state link that is coupled to the main contacts. The rotation of the crank arm continues up to a point at which the rotation is stopped, while the connection-state link continues its motion without being connected to the crank arm. In this manner, the connection-state link is decoupled from the crank arm, to relieve the crank arm from receiving the abrupt forces conducted by the connection-state link resulting from the main circuit breaker contacts closing.

A return spring in the circuit breaker is connected to the connection-state link to apply a second force to the connection-state link. When the main circuit breaker contacts are opening, the edge of the aperture of the connection-state link comes into contact with the crank pin and applies the second force to the crank pin. This imparts a rotary motion to the crank arm about the axis in a second rotary direction opposite to the first rotary direction, to rotate the auxiliary rotary switch corresponding to the opening of the main circuit breaker contacts.

In accordance with one example embodiment described herein, an auxiliary switch actuator for a circuit breaker, comprises:

- a crank arm of an auxiliary rotary switch in a circuit breaker, configured to change electrical connections of contacts in the auxiliary rotary switch when the crank arm is rotated about its axis, the rotation of the crank arm about its axis in a first rotary direction being limited to a rotation limit by a limit stop;
- a crank spring connected to the crank arm at an end opposite to the axis of the crank arm, the crank spring having a spring bias configured to apply a force to the crank arm to impart a rotary motion to the crank arm about the axis in the first rotary direction to rotate the auxiliary rotary switch;
- a connection-state link in the circuit breaker, having an aperture in the connection-state link with an edge configured to contact a crank pin mounted on the crank arm at the end opposite to the axis of the crank arm, the crank pin configured to apply the force to the edge of the aperture of the connection-state link in response to the spring bias of the crank spring;
- wherein the connection-state link contacts a drive link coupled to main contacts of the circuit breaker, the drive link configured to move the connection-state link in response to closure of the main circuit breaker contacts, to thereby reduce the force applied by the crank pin to the edge of the aperture of the connection-state link and enable the crank arm to impart the rotary motion to the crank arm about the axis in the first rotary direction to rotate the auxiliary rotary switch corresponding to the closure of the main circuit breaker contacts; and
- wherein the limit stop is configured to limit the rotation of the crank arm in the first rotary direction to the rotation limit while the edge of the aperture of the connection-state link continues to move and to cause the edge of the aperture in the connection-state link to cease contact with the crank pin mounted on the crank arm, to thereby decouple the connection-state link from the crank arm, to relieve the crank arm of forces from the drive link resulting from the main circuit breaker contacts closing.

In accordance with the example embodiment described herein, a return spring in the circuit breaker connected to the connection-state link, the return spring having a spring bias configured to apply a second force to the connection-state link;

wherein, when the edge of the aperture of the connection-state link is in contact with the crank pin mounted on the crank arm, the edge is configured to apply the second force to the crank pin to maintain the connection-state link in contact with the drive link in response to closure of the main circuit breaker contacts.

In accordance with the example embodiment described herein, wherein, the drive link is configured to not contact the connection-state link in response to opening of the main circuit breaker contacts, and the second force of the return spring on the connection-state link is configured to cause the edge of the aperture of the connection-state link to force the crank pin to impart a rotary motion to the crank arm about the axis in a second rotary direction opposite to the first rotary direction to rotate the auxiliary rotary switch corresponding to the opening of the main circuit breaker contacts.

In accordance with the example embodiment described herein, wherein, the return spring and weight of the connection-state link have a combined force that is applied by the upper edge of the aperture of the connection-state link to the crank pin, which is greater than the force of the crank spring applied to the crank pin, to impart the rotary motion to the crank arm about the axis in the second rotary direction corresponding to the opening of the main circuit breaker contacts.

In accordance with an example embodiment described herein, wherein while the main contacts are closed, a holding link coupled to the main contacts is configured to support the connection-state link against the force of the return spring;

wherein when the main contacts begin opening, the holding link is configured to remove the support of the connection-state link against the force of the return spring;

wherein the connection-state link in response to the force of the return spring, is configured to pull the crank arm and impart a rotary motion to the crank arm about the axis in a second rotary direction opposite to the first rotary direction to rotate the auxiliary rotary switch corresponding to the opening of the main circuit breaker contacts.

In accordance with an example embodiment described herein, wherein when the main circuit breaker contacts open, the upper edge of the aperture of the connection-state link pushes against the crank pin of the crank arm as it moves in the second rotary direction;

a stop pin is configured to limit the rotation of the crank arm, to set the auxiliary rotary switch corresponding to the opening of the main circuit breaker contacts.

In accordance with one example embodiment described herein, an auxiliary switch actuator for a circuit breaker, comprises:

a crank arm of an auxiliary rotary switch in a circuit breaker, configured to change electrical connections of contacts in the auxiliary rotary switch when the crank arm is rotated about its axis, the rotation of the crank arm about its axis in a first rotary direction being limited to a rotation limit by a limit stop;

a crank spring connected to the crank arm at an end opposite to the axis of the crank arm, the crank spring having a spring bias configured to apply an upward directed force to the crank arm to impart a rotary motion to the crank arm about the axis in the first rotary direction to rotate the auxiliary rotary switch;

a connection-state link in the circuit breaker, having an aperture in the connection-state link with an upper edge configured to contact a crank pin mounted on the crank arm at the end opposite to the axis of the crank arm, the crank pin configured to apply an upward directed force on the upper edge of the aperture of the connection-state link in response to the spring bias of the crank spring;

wherein the connection-state link is contacted by a drive link coupled to main contacts of the circuit breaker, the drive link configured to apply an upward directed force to the connection-state link in response to closure of the main circuit breaker contacts to move the connection-state link in the upward direction, to thereby reduce the upward directed force by the crank pin on the upper edge of the aperture of the connection-state link and enable the crank arm to impart the rotary motion to the crank arm about the axis in the first rotary direction to rotate the auxiliary rotary switch corresponding to the closure of the main circuit breaker contacts; and wherein the limit stop is configured to limit the rotation of the crank arm in the first rotary direction to the rotation limit while the upper edge of the aperture of the connection-state link continues to move in the upward direction to cause the upper edge of the aperture in the connection-state link to cease contact with the crank pin mounted on the crank arm, to thereby decouple the connection-state link from the crank arm, to relieve the crank arm of forces resulting from the main circuit breaker contacts closing.

In accordance with the example embodiment described herein, a return spring in the circuit breaker is connected to the connection-state link, the return spring having a spring bias configured to apply a downward directed force to the connection-state link;

wherein, when the upper edge of the aperture of the connection-state link is in contact with the crank pin mounted on the crank arm, the upper edge is configured to apply the downward directed force to the crank pin.

In accordance with the example embodiment described herein, wherein, the downward directed force of the return spring on the connection-state link is configured to maintain the connection-state link in contact with the upward directed force of the drive link on the connection-state link in response to closure of the main circuit breaker contacts.

In accordance with the example embodiment described herein, wherein, the drive link is configured to not apply the upward directed force to the connection-state link in response to opening of the main circuit breaker contacts, and the downward directed force of the return spring on the connection-state link is configured to cause the upper edge of the aperture of the connection-state link to apply a downward directed force on the crank pin to impart a rotary motion to the crank arm about the axis in a second rotary direction opposite to the first rotary direction to rotate the auxiliary rotary switch corresponding to the opening of the main circuit breaker contacts.

In accordance with the example embodiment described herein, wherein, the return spring and weight of the connection-state link have a combined downward directed force applied by the upper edge of the aperture of the connection-state link on the crank pin, which is greater than the upward directed force of the crank spring on the crank pin, to impart the rotary motion to the crank arm about the axis in the second rotary direction corresponding to the opening of the main circuit breaker contacts.

In accordance with one example embodiment described herein, a circuit breaker, comprises:

an auxiliary rotary switch in the circuit breaker, configured to indicate a state of main contacts of the circuit breaker as being open or closed;

a crank arm of the auxiliary rotary switch in the circuit breaker, configured to change electrical connections of contacts in the auxiliary rotary switch when the crank arm is rotated about its axis, the rotation of the crank arm about its axis in a first rotary direction being limited to a rotation limit by a limit stop;

a crank spring connected to the crank arm at an end opposite to the axis of the crank arm, the crank spring having a spring bias configured to apply a force to the crank arm to impart a rotary motion to the crank arm about the axis in the first rotary direction to rotate the auxiliary rotary switch;

a connection-state link in the circuit breaker, having an aperture in the connection-state link with an edge configured to contact a crank pin mounted on the crank arm at the end opposite to the axis of the crank arm, the crank pin configured to apply the force to the edge of the aperture of the connection-state link in response to the spring bias of the crank spring;

wherein the connection-state link contacts a drive link coupled to main contacts of the circuit breaker, the drive link configured to move the connection-state link in response to closure of the main circuit breaker contacts, to thereby reduce the force applied by the crank pin to the edge of the aperture of the connection-state link and enable the crank arm to impart the rotary motion to the crank arm about the axis in the first rotary direction to rotate the auxiliary rotary switch corresponding to the closure of the main circuit breaker contacts; and wherein the limit stop is configured to limit the rotation of the crank arm in the first rotary direction to the rotation limit while the edge of the aperture of the connection-state link continues to move and to cause the edge of the aperture in the connection-state link to cease contact with the crank pin mounted on the crank arm, to thereby decouple the connection-state link from the crank arm, to relieve the crank arm of forces from the drive link resulting from the main circuit breaker contacts closing.

In accordance with the example embodiment described herein, a return spring in the circuit breaker connected to the connection-state link, the return spring having a spring bias configured to apply a second force to the connection-state link;

wherein, when the edge of the aperture of the connection-state link is in contact with the crank pin mounted on the crank arm, the edge is configured to apply the second force to the crank pin to maintain the connection-state link in contact with the drive link in response to closure of the main circuit breaker contacts.

In accordance with the example embodiment described herein, wherein, the drive link is configured to not contact the connection-state link in response to opening of the main circuit breaker contacts, and the second force of the return spring on the connection-state link is configured to cause the edge of the aperture of the connection-state link to force the crank pin to impart a rotary motion to the crank arm about the axis in a second rotary direction opposite to the first rotary direction to rotate the auxiliary rotary switch corresponding to the opening of the main circuit breaker contacts.

In accordance with the example embodiment described herein, wherein, the return spring and weight of the connection-state link have a combined force that is applied by the upper edge of the aperture of the connection-state link to the crank pin, which is greater than the force of the crank spring applied to the crank pin, to impart the rotary motion to the crank arm about the axis in the second rotary direction corresponding to the opening of the main circuit breaker contacts.

The resulting apparatus provides a mechanical mechanism for signaling the open or closed state of the main current carrying contacts to the auxiliary switches, which reduces the forces transmitted to the auxiliary switch.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1A:
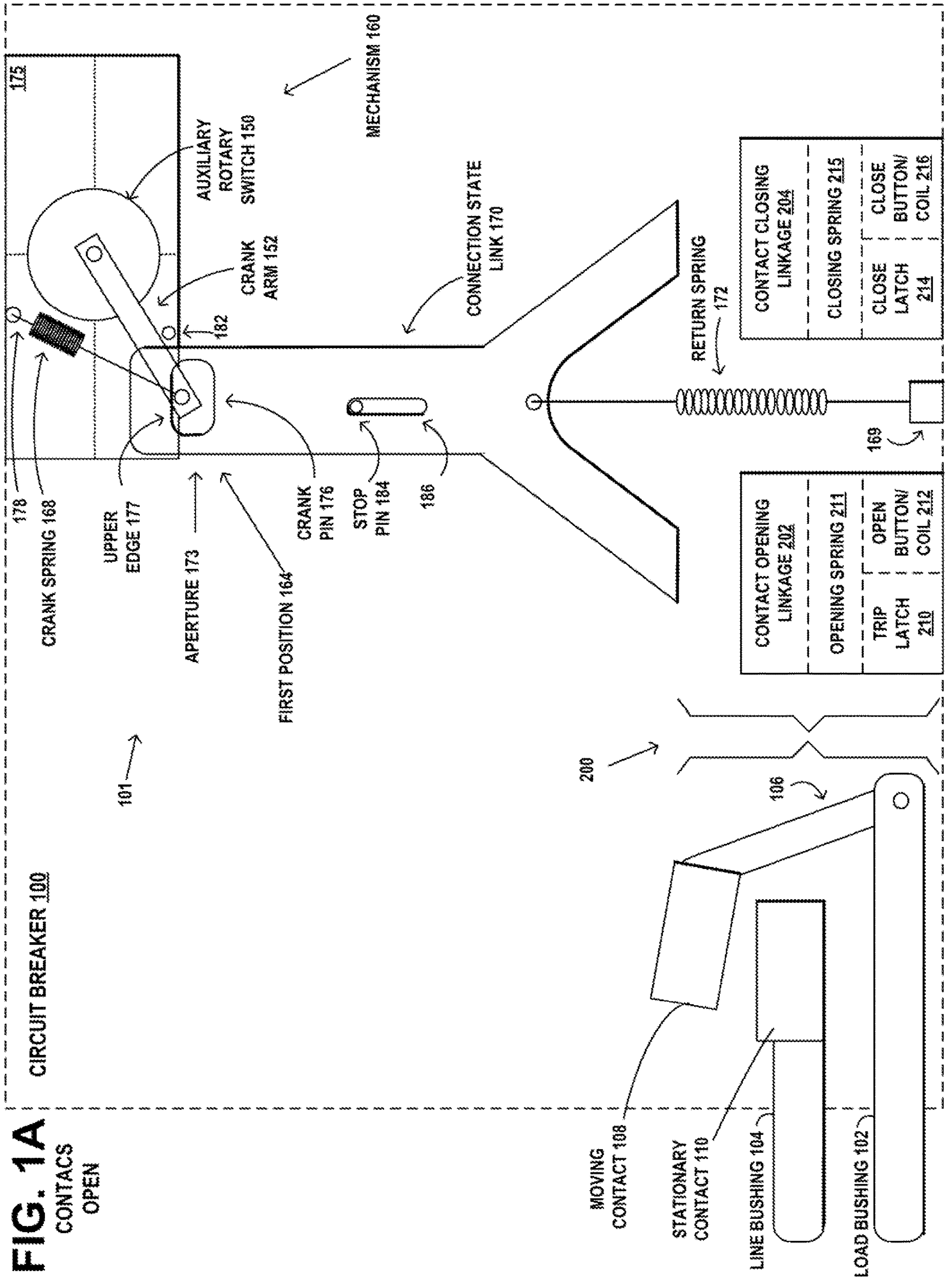
FIGS. 1A to 1F illustrate a sequence of steps performed by an auxiliary switch actuator in a medium voltage circuit breaker, which reduce the forces on the auxiliary switch resulting from closing the main contacts of the circuit breaker, in accordance with an embodiment disclosed herein.
Figure 1B:
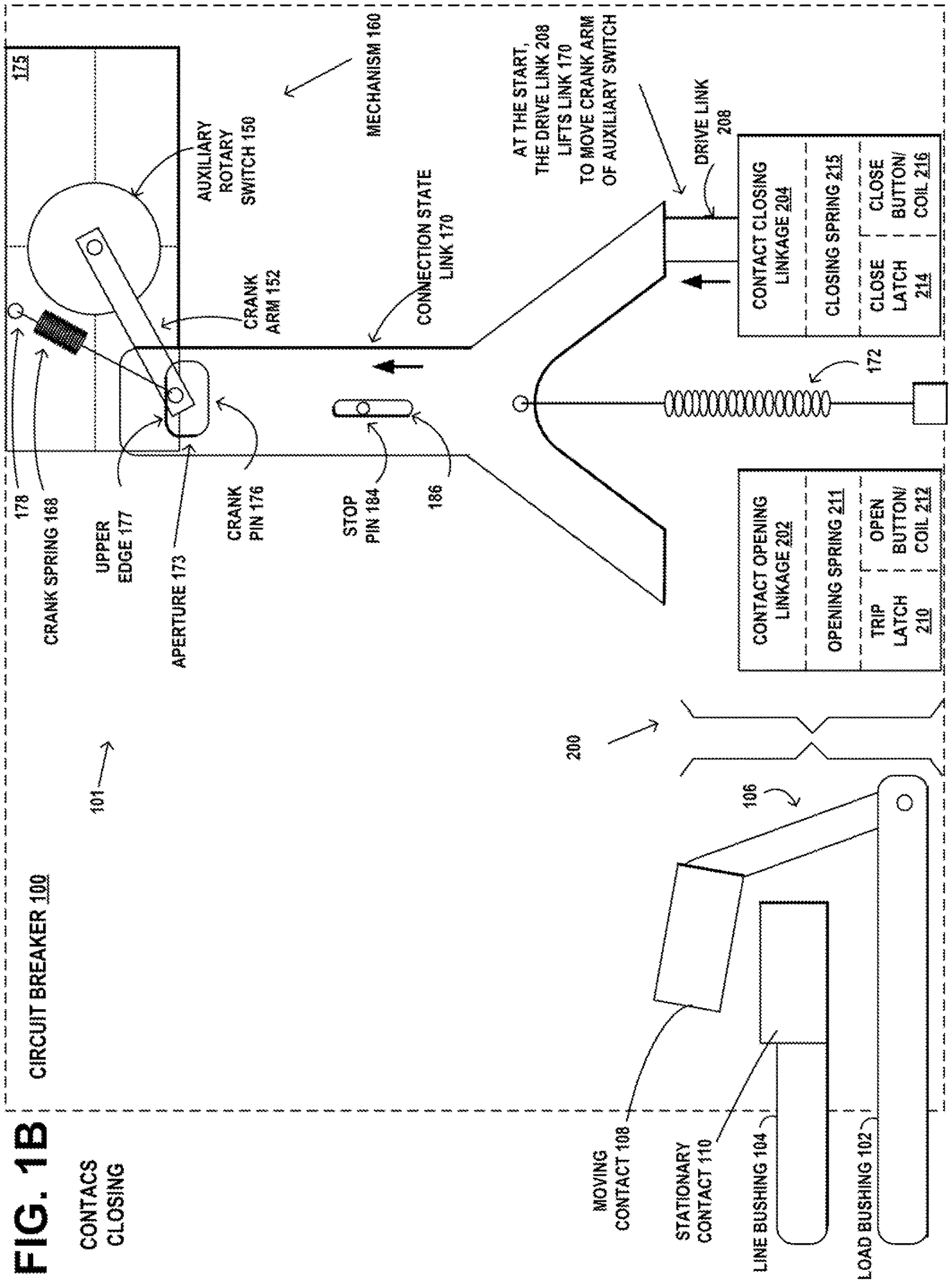
Figure 1C:
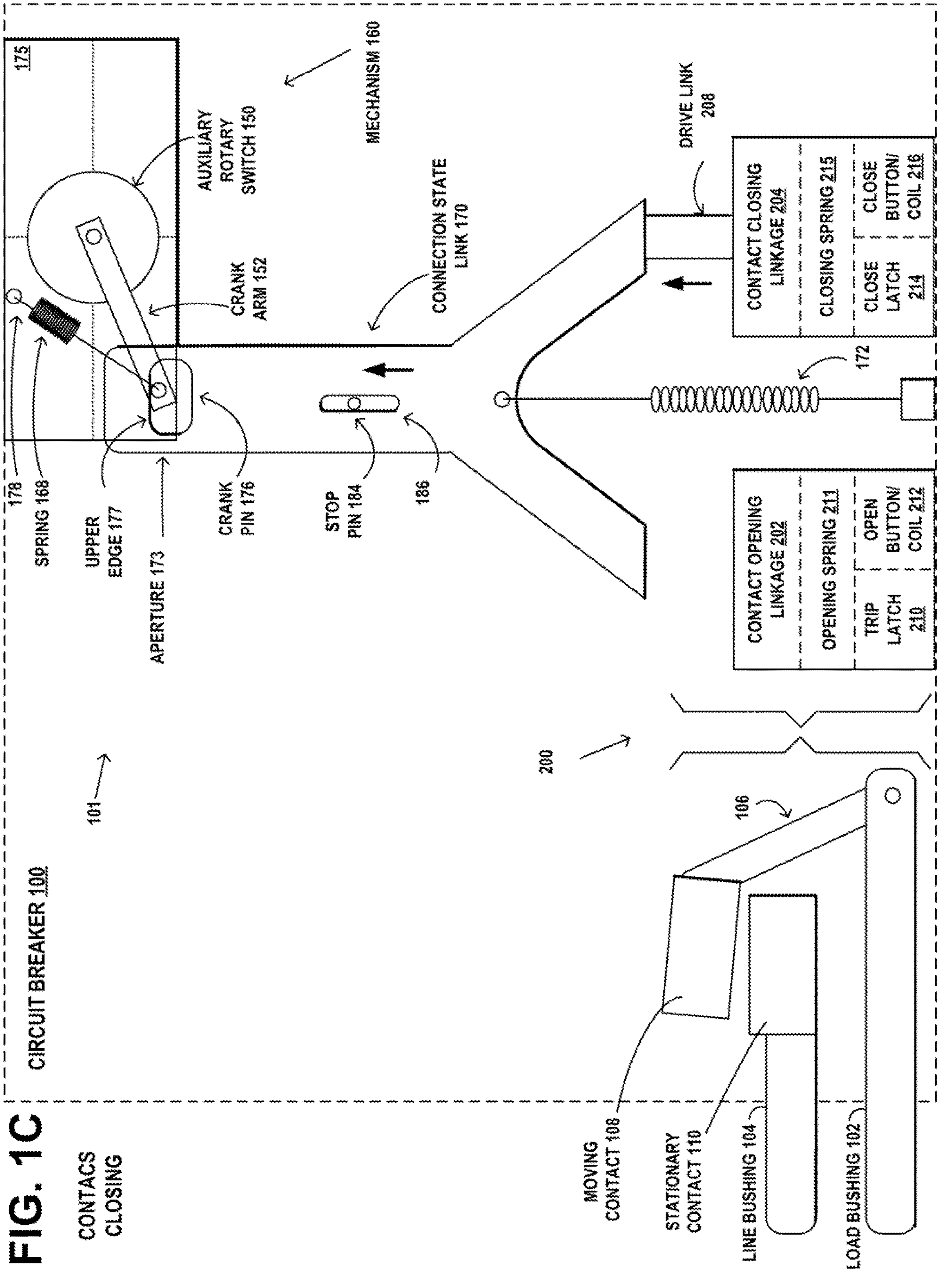
Figure 1D:
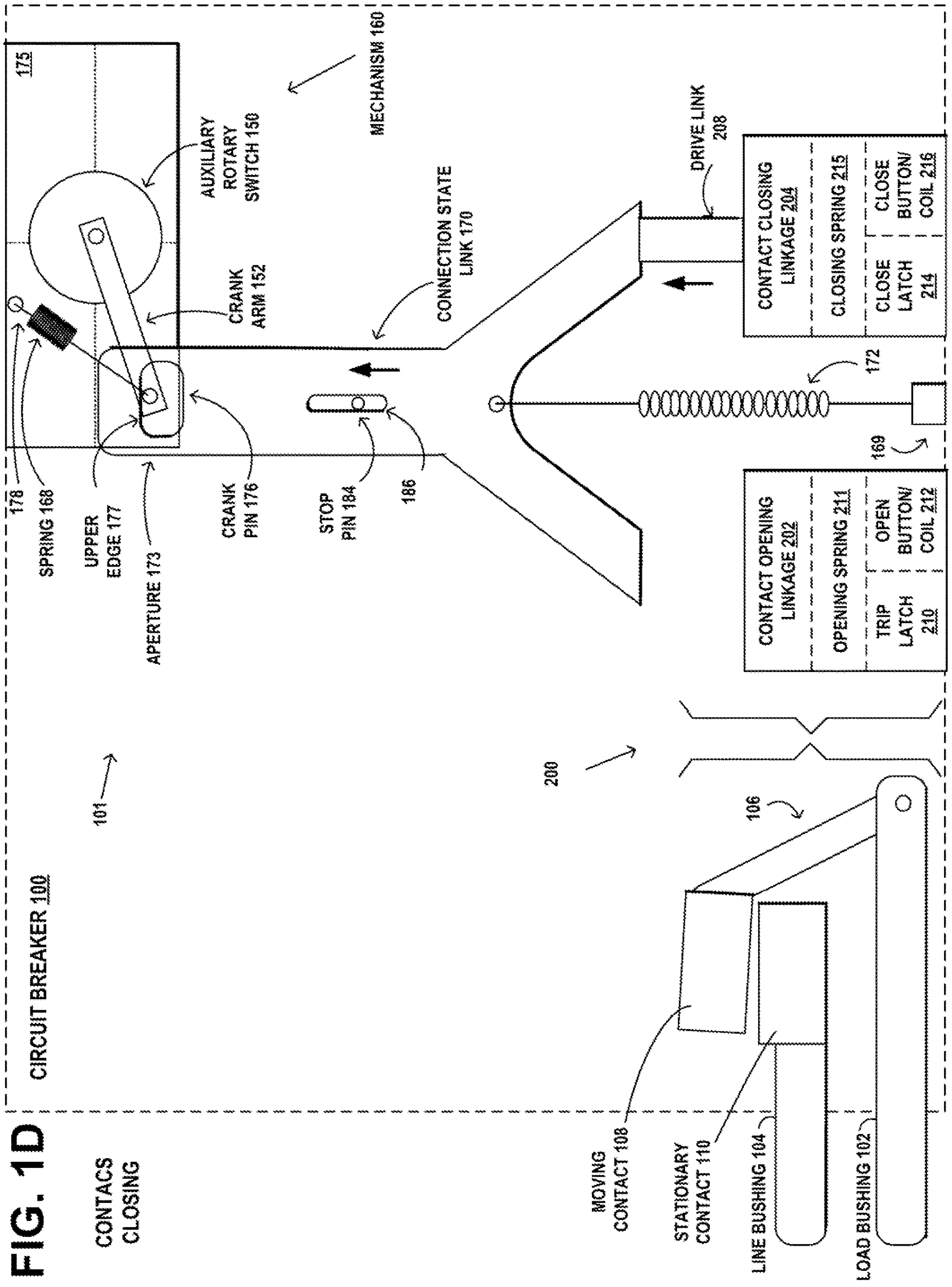
Figure 1E:
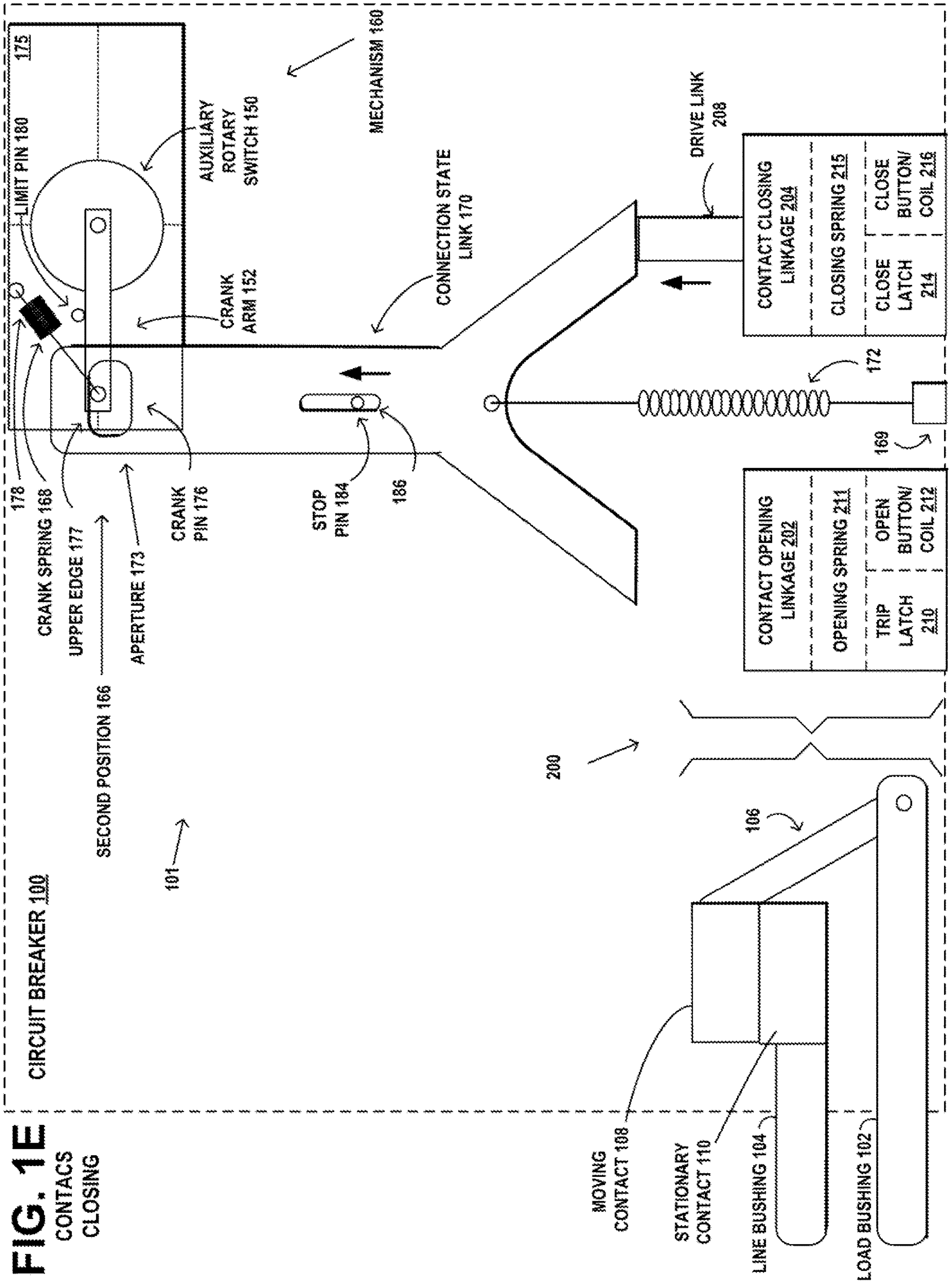

Generally, medium voltage circuit breakers have a rated maximum voltage of from 5 to 15 kV, a rated continuous current of from 1200 to 2000 Amperes, at a rated power frequency of 60 Hz. A racking mechanism is used to insert or rack the breaker into a metal-enclosed switchgear cabinet having line and load primary buses accessible at the back of the cabinet. When the line and load primary disconnects of the breaker are initially connected to the primary buses, the main contacts of the breaker remain open in what is referred to as the disconnected position. While in the disconnected position with the main contacts open, secondary power may be connected to the breaker to enable testing. For each phase, the breaker has a moving contact arm with one end pivotally connected to a corresponding phase load-side primary connector or bushing. The bushing is connected to a corresponding phase load-side disconnect, and the moving contact arm has a main contact on the other end. For each phase, the breaker has a stationary contact connected to a corresponding phase line-side primary connector or bushing connected to a corresponding phase line-side disconnect. For each contact arm, an insulated link connects the moving arm to contact closing linkage and contact opening linkage that open or close the main contacts of the breaker.

To reduce the destructive effects of arcing on the main contacts, medium voltage circuit breakers are designed to rapidly close the main contacts by means of a closing spring that is compressed by a charging motor or manual charge handle to store mechanical energy. When the closing spring has been compressed to the charged position, a closing latch holds the closing spring in a fully compressed position. When a close button is pressed or a close coil is energized, the close latch is removed and the closing spring engages the closing linkage to abruptly force the contact arm to drive the main contacts together. When the main contacts close, the contact opening linkage latches the contacts in the closed position with a trip latch, to allow the closing spring to return to its originally decompressed state, enabling it to be recharged.

Medium voltage circuit breakers are designed to rapidly open the main contacts by means of an opening spring during a trip event, to limit the peak magnitude of fault current that flows through the main contacts to within a AC first half-cycle after fault initiation, before the fault current has a chance to reach its peak value. The opening spring is compressed during the close operation and its energy is stored until a trip event occurs, or until an open button is pressed or an open coil is energized. When the main contacts are in the closed position, the trip latch is in position to hold the contacts closed. For the circuit breaker to remain in the closed position, the main contacts have to be held in the closed position by the trip latch. To trip the circuit breaker, either by a trip event or by pressing the open button or energizing the open coil, the trip latch is removed and the opening spring engages the opening linkage to force the contact arm to drive the main contacts apart.

Medium voltage circuit breakers are designed with an auxiliary switch that is mechanically coupled so as to respond to the opening or closing of the main contacts, so that auxiliary contacts change state when the main contacts change. The auxiliary switch passes data on the state of the contacts to a logic controller, which in turn gives instructions to linked devices about whether to turn on or off. An auxiliary circuit is designed to control, measure, signal and regulate other parts of the breaker, other than the main breaker current.

FIGS. 1A to 1F illustrate a sequence of steps performed by an auxiliary switch actuator 101 in a medium voltage circuit breaker 100, which reduce the forces on the auxiliary switch 150 resulting from closing the main contacts 108 and 110 of the circuit breaker, in accordance with an embodiment disclosed herein.

The circuit breaker 100 may be a three phase unit in which each phase has a moving contact arm 106 with one end pivotally connected to a corresponding phase load-side primary connector or bushing 102. The moving contact arm 106 has a main moving contact 108 on the other end. For each phase, the breaker 100 has a stationary contact 110 connected to a corresponding phase line-side primary connector or bushing 104.

Each contact arm 106 connects to a contact closing linkage 204, via the linkage functional interface 200, to close the main contacts 108 and 110 when the close button is pressed or close coil is energized 216, which removes the close latch 214 so that the closing linkage 204 forces the contact arm 106 to drive the main contacts 108 and 110 together. An example of the structure and operation of the linkage functional interface 200, contact closing linkage 204, close latch 214, close coil 216, and closing spring 215 to close the main contacts 108 and 110 is disclosed in U.S. Pat. No. 3,773,995 to Davies, entitled "Motor Advanced Spring Charging Pawl and Ratchet Mechanism with Spring Assist", issued Nov. 20, 1973, which disclosure is incorporated herein by reference.

Each contact arm 106 connects to a contact opening linkage 202, via the linkage functional interface 200, to open the main contacts 108 and 110, either when a trip event occurs or when the open button is pressed or open coil is energized 212, which removes the trip latch 210 so that the opening linkage 202 forces the contact arm 106 to drive the main contacts 108 and 110 apart. When the trip latch 210 is removed, the opening spring 211 engages the contact opening linkage 202 to force the contact arm 106 to drive the main contacts apart. An example of the structure and operation of the contact opening linkage 202, trip event detection, trip latch 210, and opening spring 211 to force the main contacts apart is disclosed in the U.S. Pat. No. 3,773,995 to Davies, entitled "Motor Advanced Spring Charging Pawl and Ratchet Mechanism with Spring Assist", issued Nov. 20, 1973, which disclosure is incorporated herein by reference.

The auxiliary switch actuator 101 includes a crank arm 152 of the auxiliary rotary switch 150 in the circuit breaker 100, which changes electrical connections of contacts in the auxiliary rotary switch when the crank-arm 152 is rotated about its axis. The auxiliary switch actuator 101 includes mechanism 160 configured to move the crank arm 152 in two different resting positions 164 (FIG. 1A) and 166 (FIG. 1F) with respect to the axis of the crank arm 152. The mechanism 160 includes spring 168 attached at one end to a support 178 in the chassis 175 of the circuit breaker 100, and the other end of the spring 168 may be coupled to the crank arm 152. In some embodiments the spring 168 may be directly connected to the crank pin 176 of the crank arm 152 and in other embodiments, there may be intermediate links that connect the spring 168 to the crank arm 152.

Figure 1F:
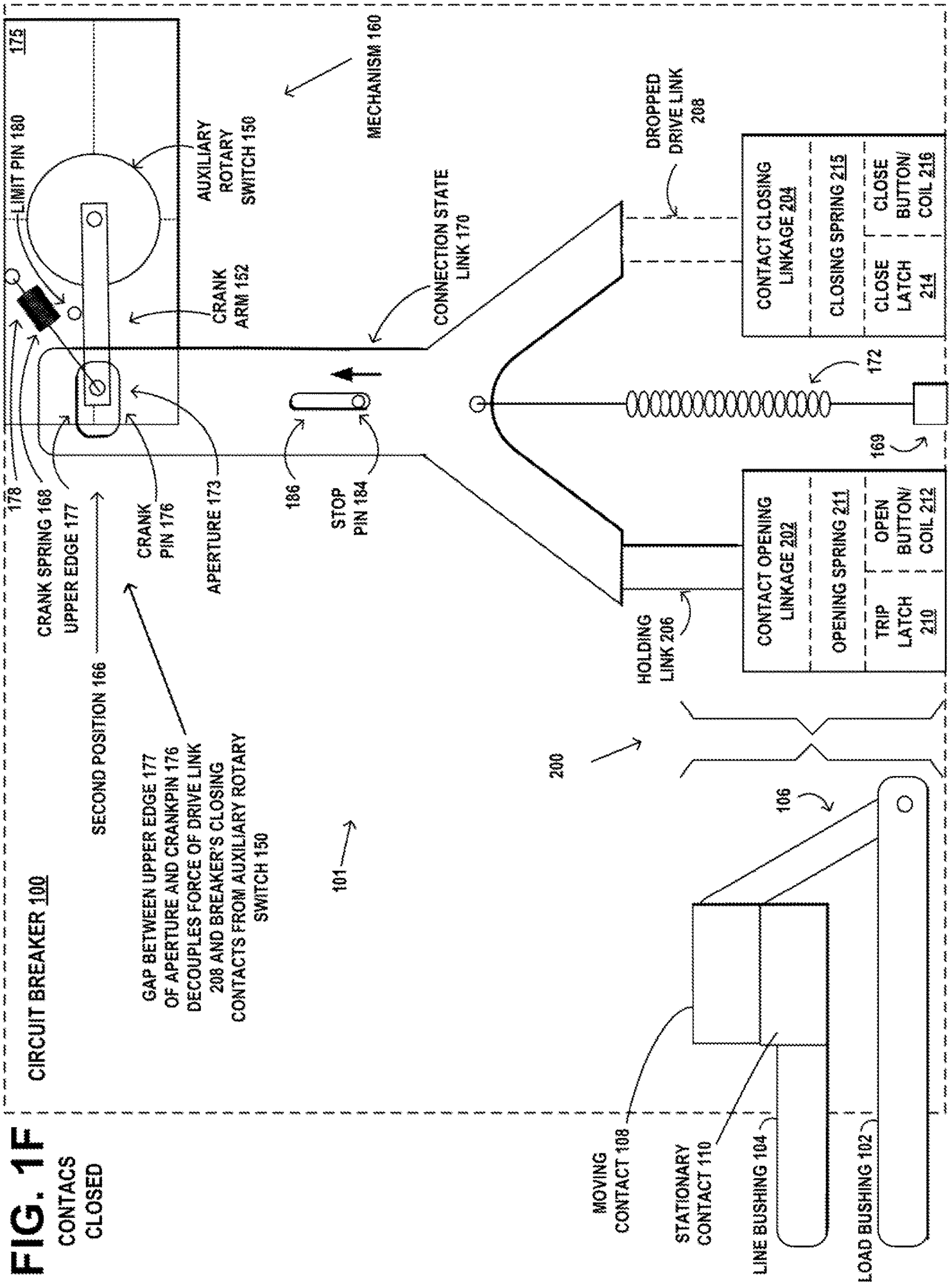

A connection-state link 170 is coupled to the main contacts 108 and 110 of the circuit breaker 100, by means of the contact closing linkage 204 and the contact opening linkage 202. In FIG. 1A, the downward spring force of the return spring 172 that is anchored by support 169 and the weight of the connection-state link 170, counteract the upward spring force of the crank spring 168 on the crank arm 152, to hold the crank spring 168 down, as shown in FIG. 1A. The contact closing linkage 204 extends a drive link 208 (FIGS. 1B to 1E) to push upward against the connection-state link 170 to move it upward, as shown in the sequence of FIGS. 1B to 1F, in response to pressing the close button or energizing the close coil 216. The upward-moving connection-state link 170 is configured to move the crank arm 152 upward toward the second position 166 (FIG. 1F) when the main circuit breaker contacts 108 and 110 close. The crank pin 176 is configured to apply an upward directed force on the upper edge 177 of the aperture 173 of the connection-state link 170 in response to the spring bias of the crank spring 168. The upward motion of the connection-state link 170 reduces the upward directed force by the crank pin 176 on the upper edge 177 of the aperture 173 of the connection-state link 170, resulting in the crank arm 152 then being pulled upward by the crank spring 168, thereby causing the crank-arm 152 to rotate clockwise until stopped by the limit pin 180 in FIG. 1E. The upper edge 177 of the aperture 173 of the connection-state link 170 continues to move in the upward direction, to cause the upper edge 177 to cease contact with the crank pin 176 on the crank arm 152, as shown in FIG. 1F. This action thereby decouples the connection-state link 170 from the crank arm 152, which relieves the crank arm 152 from forces conducted by the connection-state link 170 and the drive link 208 resulting from the main circuit breaker contacts closing. When the main contacts are fully closed (FIG. 1F), the contact opening linkage 202, via the linkage functional interface 200, latches the contacts in the closed position with the trip latch 210, to allow the closing spring 215 to return to its originally decompressed state, enabling it to be recharged. In FIG. 1F, the contact opening linkage 202 extends a holding link 206 to support the connection-state link 170 against the downward spring force of the return spring 172 that is anchored by support 169. The contact closing linkage 204 drops or withdraws the drive link 208 from supporting the connection-state link 170 against the downward spring force of the return spring 172 (FIG. 1F). A stop pin 184 in the slot 186 of the connection-state link 170, guides the connection-state link 170 as it moves up and down in the sequence of FIGS. 1A to 1F.

The crank arm 152 of the auxiliary rotary switch 150 is configured to change electrical connections of contacts in the auxiliary rotary switch 150 when the crank arm 152 is rotated about its axis. The rotation of the crank arm 152 about its axis in a first or clockwise rotary direction is limited to a rotation limit by a limit pin 180 or limit stop.

The crank spring 168 connected to the crank arm 152 at an end opposite to the axis of the crank arm 152, has a spring bias configured to apply an upward directed force to the crank arm 152 to impart a rotary motion to the crank arm 152 about the axis in the first rotary or clockwise direction to rotate the auxiliary rotary switch 150.

The connection-state link 170 in the circuit breaker 100, has an aperture 173 with an upper edge 177 configured to contact the crank pin 176 mounted on the crank arm 152 at the end opposite to the axis of the crank arm 152. The crank pin 176 is configured to apply an upward directed force on the upper edge 177 of the aperture 173 of the connection-state link 170 in response to the spring bias of the crank spring 168.

The connection-state link 170 is contacted by the drive link 208 coupled to the main contacts 108/110 of the circuit breaker 100. The drive link is configured to apply an upward directed force to the connection-state link 170 in response to closure of the main circuit breaker contacts 108/110 to move the connection-state link 170 in the upward direction. This action thereby reduces the upward directed force by the crank pin 176 on the upper edge 177 of the aperture 173 of the connection-state link 170 and enables the crank arm 152 to impart the rotary motion to the crank arm 152 about the axis in the first or clockwise rotary direction to rotate the auxiliary rotary switch 150 corresponding to the closure of the main circuit breaker contacts.

The limit pin 180 (FIG. 1F) or limit stop is configured to limit the rotation of the crank arm 152 in the first or clockwise rotary direction to the rotation limit, while the upper edge 177 of the aperture 173 of the connection-state link 170 continues to move in the upward direction, to cause the upper edge 177 of the aperture 173 in the connection-state link 170 to cease contact with the crank pin 176 mounted on the crank arm 152. This action thereby decouples the connection-state link 170 from the crank arm 152, to relieve the crank arm 152 from forces conducted by the connection-state link 170 and the drive link 208 resulting from the main circuit breaker contacts closing.

The drive link 208 provides support to the connection-state link 170 against the downward spring force of the return spring 172. This support ends when the contact closing linkage 204 drops or withdraws the drive link 208 (FIG. 1F).

Figure 2A:
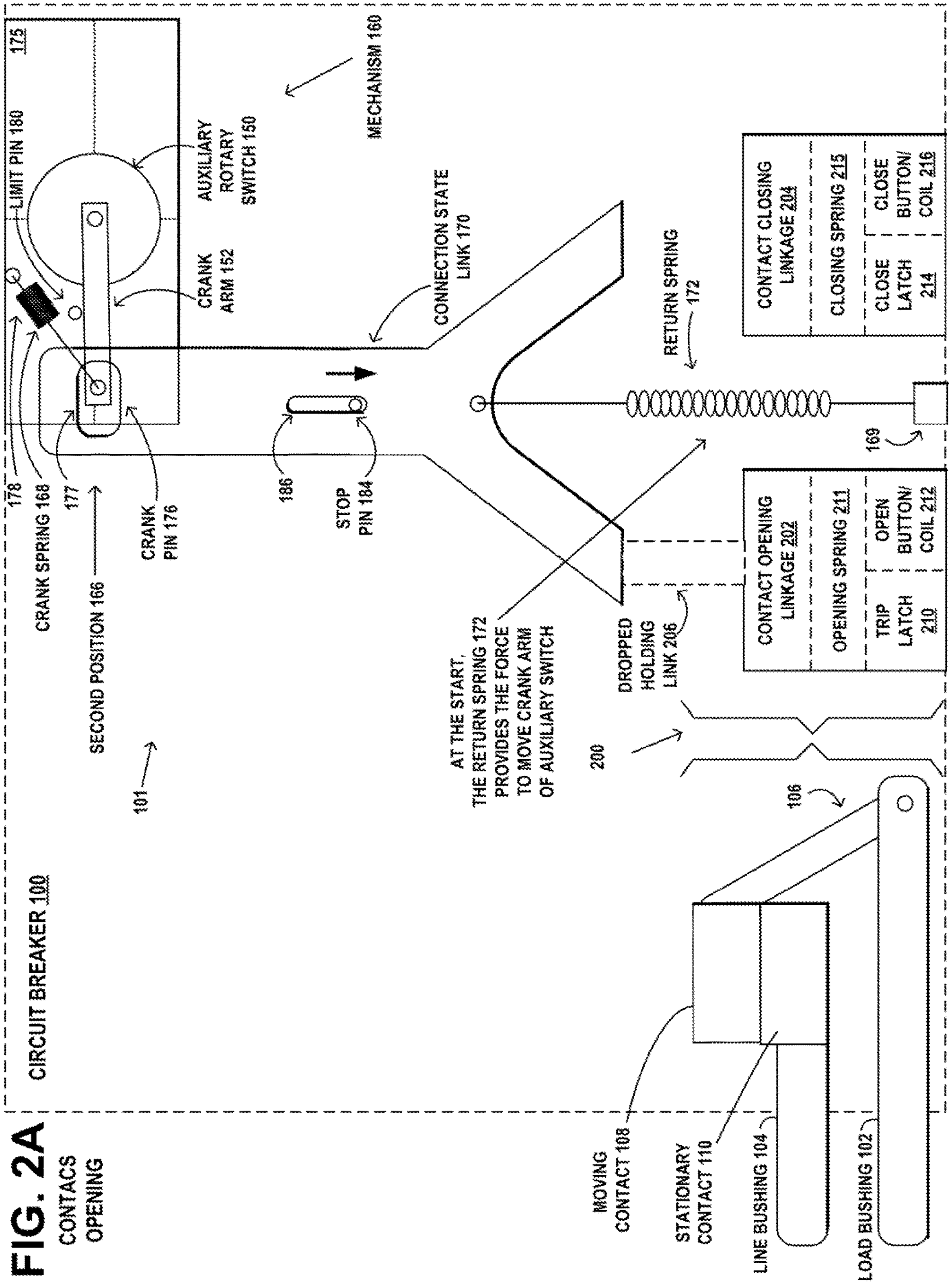
FIGS. 2A to 2C illustrate a sequence of steps performed by the auxiliary switch actuator in the medium voltage circuit breaker of FIG. 1A, which resets the electrical connections in the auxiliary switch resulting from opening the main contacts of the circuit breaker, in accordance with an embodiment disclosed herein.
Figure 2B:
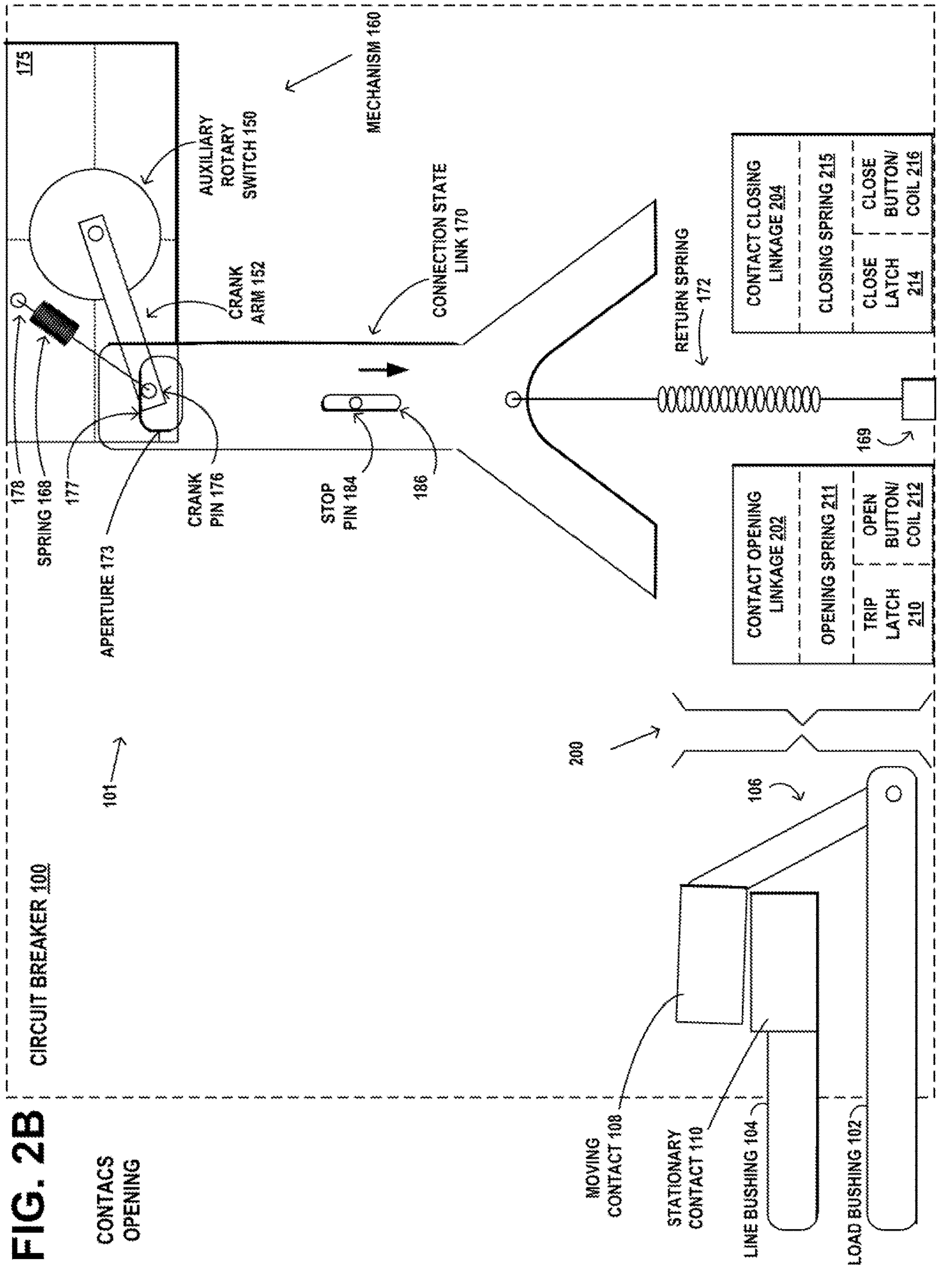
Figure 2C:
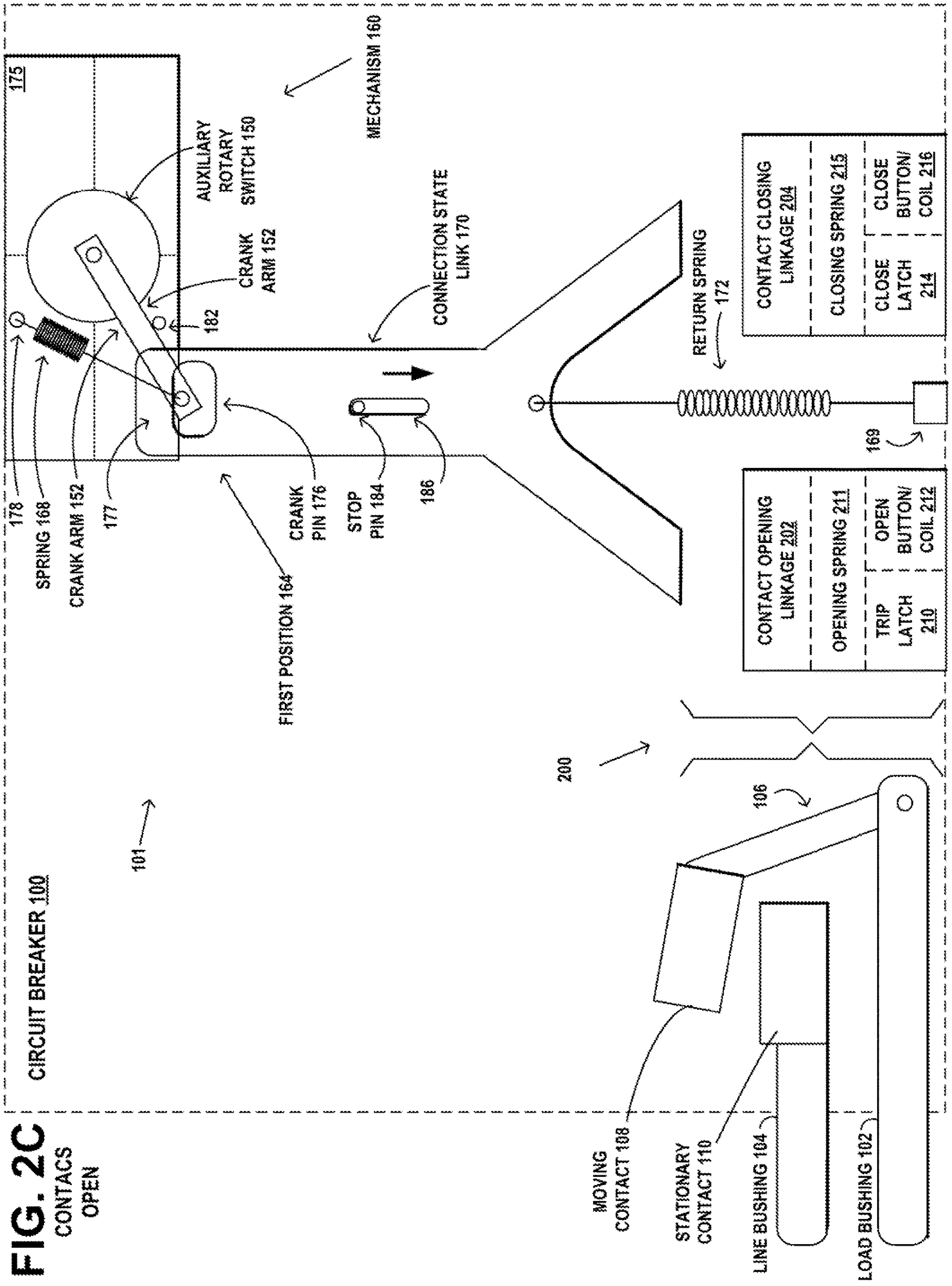

FIGS. 2A to 2C illustrate a sequence of steps performed by the auxiliary switch actuator 101 in the medium voltage circuit breaker 100 of FIG. 1A, which resets the electrical connections in the auxiliary switch 150 resulting from opening the main contacts 108 and 110 of the circuit breaker, in accordance with an embodiment disclosed herein.

Each contact arm 106 connects to an opening linkage 202, via the linkage functional interface 200, to open the main contacts 108 and 110, either when a trip event occurs or when the open button is press or the open coil is energized 212, which removes the trip latch 210 so that the opening linkage 202 forces the contact arm 106 to drive the main contacts 108 and 110 apart.

In the auxiliary switch actuator 101, when the main contacts begin opening (FIG. 2A), the contact opening linkage 202 drops or withdraws the holding link 206 from supporting the connection-state link 170 against the downward spring force of the return spring 172. The dropping of the holding link 206 relieves the crank arm 152 from forces conducted by the connection-state link 170 and the holding link 206 resulting from the main circuit breaker contacts opening. The guide pin 184 in the slot 186 of the connection-state link 170, guides the connection-state link 170 as it begins to move downward and limits the movement at the bottom. The connection-state link 170, under the spring force of the return spring 172 and the weight of the connection-state link 170, is configured to pull the crank arm 152 from the second position 166 toward the first position (FIG. 2C) when the main circuit breaker contacts 108 and 110 open, thereby to force the crank-arm 152 of the auxiliary rotary switch 150 to rotate in the opposite or counter-clockwise direction. The upper edge 177 of the aperture 173 of the connection-state link 170 pushes against the pin 176 of the crank arm 152 as it moves from the second position 166 toward the first position 164 (FIG. 2C). Rotation of the crank arm 152 is limited by the stop pin 182 (FIG. 2C). The stop pin 182 is configured to limit the rotation of the crank arm 152, to set the electrical connections in the auxiliary rotary switch 150 corresponding to the opening of the main circuit breaker contacts 108/110. The stop pin 184 stops the downward motion of the connection-state link 170, which also serves to limit the rotation of the crank arm 152.

Figure 3:
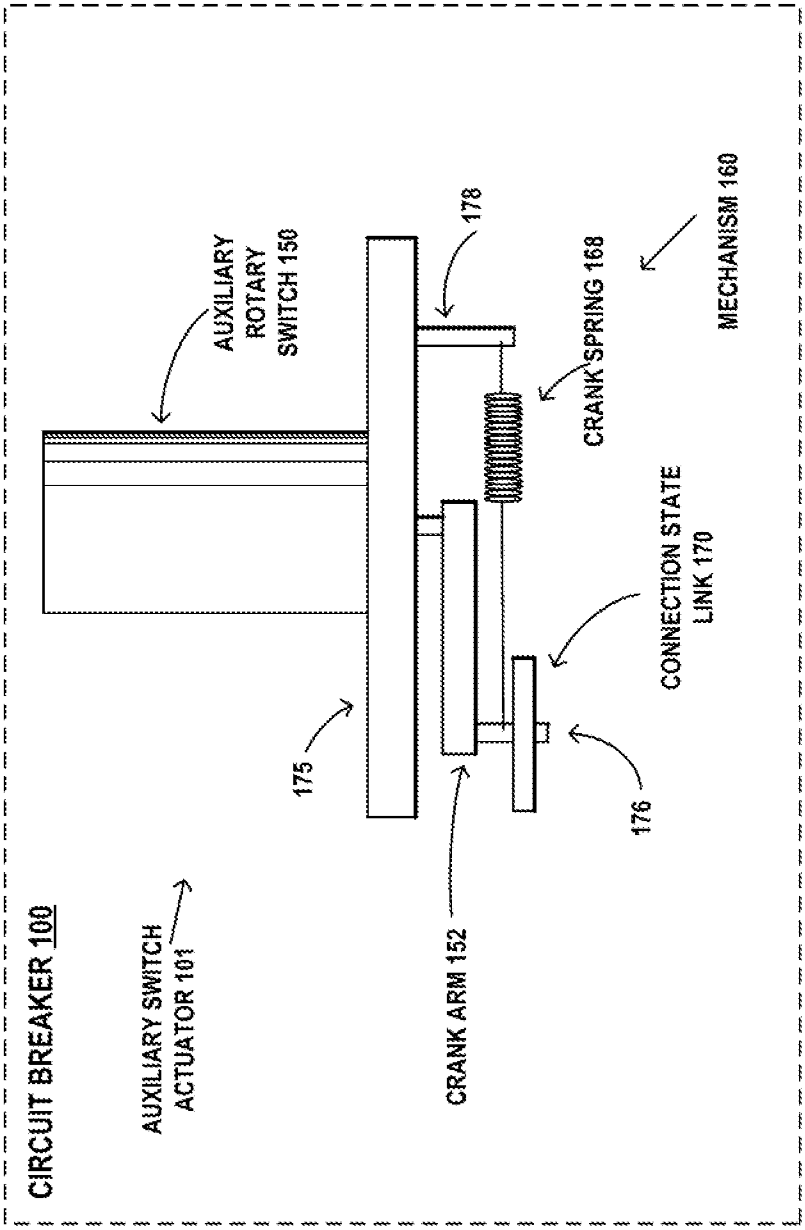
FIG. 3 is a top view of the auxiliary switch actuator in the medium voltage circuit breaker of FIG. 1A, in accordance with an embodiment disclosed herein.

FIG. 3 is a top view of the auxiliary switch actuator 101 in the medium voltage circuit breaker 100 of FIG. 1A, in accordance with an embodiment disclosed herein. The figure illustrates an example of the relative positions of the crank arm 152, the auxiliary rotary switch 150, the over-center mechanism 160, the over-center spring 168, the support 178, the crank pin 176, and the chassis 175 of the circuit breaker 100.

The resulting apparatus provides a mechanical mechanism in the circuit breaker, for signaling the open or closed state of the main current carrying contacts to the auxiliary switches, which reduces the forces transmitted to the auxiliary switch.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An auxiliary switch actuator for a circuit breaker, comprising:

a crank arm of an auxiliary rotary switch in the circuit breaker, configured to change electrical connections of contacts in the auxiliary rotary switch when the crank arm is rotated about an axis of the crank arm, a rotation of the crank arm about the axis of the crank arm in a first rotary direction being limited to a rotation limit by a limit stop;

a crank spring connected to the crank arm at an end opposite to the axis of the crank arm, the crank spring having a spring bias configured to apply a force to the crank arm to impart a rotary motion to the crank arm about the axis in the first rotary direction to rotate the auxiliary rotary switch;

a connection-state link in the circuit breaker, having an aperture in the connection-state link with an edge configured to contact a crank pin mounted on the crank arm at the end opposite to the axis of the crank arm, the crank pin configured to apply a force to the edge of the aperture of the connection-state link in response to the spring bias of the crank spring;

wherein the connection-state link contacts a drive link coupled to main contacts of the circuit breaker, the drive link configured to move the connection-state link in response to closure of the main contacts of the circuit breaker, to thereby reduce the force applied by the crank pin to the edge of the aperture of the connection-state link and enable the crank arm to impart the rotary motion to the crank arm about the axis in the first rotary direction to rotate the auxiliary rotary switch corresponding to the closure of the main contacts of the circuit breaker; and wherein the limit stop is configured to limit the rotation of the crank arm in the first rotary direction to the rotation limit while the edge of the aperture of the connection-state link continues to move and to cause the edge of the aperture in the connection-state link to cease contact with the crank pin mounted on the crank arm, to thereby decouple the connection-state link from the crank arm, to relieve the crank arm of forces from the drive link resulting from the main contacts of the circuit breaker closing.

2. The auxiliary switch actuator for the circuit breaker of claim 1, further comprising:

a return spring in the circuit breaker connected to the connection-state link, the return spring having a spring bias configured to apply a second force to the connection-state link;

wherein, when the edge of the aperture of the connection-state link is in contact with the crank pin mounted on the crank arm, the edge is configured to apply the second force to the crank pin to maintain the connection-state link in contact with the drive link in response to closure of the main contacts of the circuit breaker.

3. The auxiliary switch actuator for the circuit breaker of claim 2, further comprising:

wherein, the drive link is configured to not contact the connection-state link in response to opening of the main contacts of the circuit breaker, and the second force of the return spring on the connection-state link is configured to cause the edge of the aperture of the connection-state link to force the crank pin to impart a rotary motion to the crank arm about the axis in a second rotary direction opposite to the first rotary direction to rotate the auxiliary rotary switch corresponding to the opening of the main contacts of the circuit breaker.

4. The auxiliary switch actuator for the circuit breaker of claim 3, further comprising:

wherein, the second force of the return spring and weight of the connection-state link have a combined force that is applied by the edge of the aperture of the connection-state link to the crank pin, which is greater than the force of the crank spring applied to the crank pin, to impart the rotary motion to the crank arm about the axis in the second rotary direction corresponding to the opening of the main contacts of the circuit breaker.

5. The auxiliary switch actuator for the circuit breaker of claim 4, further comprising:

wherein, while the main contacts are closed, a holding link coupled to the main contacts is configured to support the connection-state link against the second force of the return spring;

wherein, when the main contacts begin opening, the holding link is configured to remove the support to the connection-state link against the force of the return spring; and wherein, the connection-state link in response to the second force of the return spring, is configured to pull the crank arm and impart a rotary motion to the crank arm about the axis in the second rotary direction opposite to the first rotary direction to rotate the auxiliary rotary switch corresponding to the opening of the main contacts of the circuit breaker.

6. The auxiliary switch actuator for the circuit breaker of claim 5, further comprising:

wherein, when the main contacts of the circuit breaker open, the edge of the aperture of the connection-state link pushes against the crank pin of the crank arm as the crank arm moves in the second rotary direction; and a stop pin is configured to limit the rotation of the crank arm in the second rotary direction, which resets the electrical connections in the auxiliary rotary switch corresponding to the circuit breaker contacts opening.

7. An auxiliary switch actuator for a circuit breaker, comprising:

a crank arm of an auxiliary rotary switch in the circuit breaker, configured to change electrical connections of contacts in the auxiliary rotary switch when the crank arm is rotated about an axis of the crank arm, a rotation of the crank arm about the axis of the crank arm in a first rotary direction being limited to a rotation limit by a limit stop;

a crank spring connected to the crank arm at an end opposite to the axis of the crank arm, the crank spring having a spring bias configured to apply a force to the crank arm to impart a rotary motion to the crank arm about the axis in the first rotary direction to rotate the auxiliary rotary switch;

a connection-state link in the circuit breaker, having an aperture in the connection-state link with an edge configured to contact a crank pin mounted on the crank arm at the end opposite to the axis of the crank arm, the crank pin configured to apply a force on the edge of the aperture of the connection-state link in response to the spring bias of the crank spring;

wherein the connection-state link is contacted by a drive link coupled to main contacts of the circuit breaker, the drive link configured to apply a force to the connection-state link in response to closure of the main contacts of the circuit breaker to move the connection-state link in a first direction, to thereby reduce the force by the crank pin on the edge of the aperture of the connection-state link and enable the crank arm to impart the rotary motion to the crank arm about the axis in the first rotary direction to rotate the auxiliary rotary switch corresponding to the closure of the main contacts of the circuit breaker;

wherein the limit stop is configured to limit the rotation of the crank arm in the first rotary direction to the rotation limit while the edge of the aperture of the connection-state link continues to move in the first direction to cause the edge of the aperture in the connection-state link to cease contact with the crank pin mounted on the crank arm, to thereby decouple the connection-state link from the crank arm, to relieve the crank arm of forces resulting from the main contacts of the circuit breaker closing;

wherein the connection-state link comprises a first end proximate to the crank spring and a second end distal to the crank spring;

wherein a force applied in a direction from the second end of the connection-state link to the first end of the connection-state link is defined as an upward directed force applied in an upward direction;

wherein the edge of the aperture of the connection-state link is an edge proximate to the first end of the connection-state link and is defined as an upper edge of the aperture;

wherein the force applied by the spring bias of the crank spring to the crank arm is an upward directed force;

wherein the force applied by the crank pin to the edge of the aperture of the connection-state link is an upward directed force; and wherein the force applied by the drive link to the connection-state link is an upward directed force to move the connection-state link in the upward direction.

8. The auxiliary switch actuator for the circuit breaker of claim 7, wherein a force applied in a direction from the first end of the connection-state link to the second end of the connection-state link is defined as a downward directed force applied in a downward direction, the auxiliary switch actuator for the circuit breaker further comprising:

a return spring in the circuit breaker connected to the connection-state link, the return spring having a spring bias configured to apply a downward directed force to the connection-state link;

wherein, when the edge of the aperture of the connection-state link is in contact with the crank pin mounted on the crank arm, the edge is configured to apply the force of the spring bias of the return spring to the crank pin.

9. The auxiliary switch actuator for the circuit breaker of claim 8, further comprising:

wherein, the force of the return spring on the connection-state link is configured to maintain the connection-state link in contact with the force of the drive link on the connection-state link in response to closure of the main contacts of the circuit breaker.

10. The auxiliary switch actuator for the circuit breaker of claim 8, further comprising:

wherein, the drive link is configured to not apply the force to the connection-state link in response to opening of the main contacts of the circuit breaker, and the force of the return spring on the connection-state link is configured to cause the edge of the aperture of the connection-state link to apply a downward directed force on the crank pin to impart a rotary motion to the crank arm about the axis in a second rotary direction opposite to the first rotary direction to rotate the auxiliary rotary switch corresponding to the opening of the main contacts of the circuit breaker.

11. The auxiliary switch actuator for the circuit breaker of claim 10, further comprising:

wherein, the force of the return spring and weight of the connection-state link have a combined downward directed force applied by the edge of the aperture of the connection-state link to the crank pin, which is greater than the force of the crank spring on the crank pin, to impart the rotary motion to the crank arm about the axis in the second rotary direction corresponding to the opening of the main contacts of the circuit breaker.

12. A circuit breaker, comprising:

an auxiliary rotary switch in the circuit breaker, configured to indicate a state of main contacts of the circuit breaker as being open or closed;

a crank arm of the auxiliary rotary switch in the circuit breaker, configured to change electrical connections of contacts in the auxiliary rotary switch when the crank arm is rotated about an axis of the crank arm, a rotation of the crank arm about the axis of the crank arm in a first rotary direction being limited to a rotation limit by a limit stop;

a crank spring connected to the crank arm at an end opposite to the axis of the crank arm, the crank spring having a spring bias configured to apply a force to the crank arm to impart a rotary motion to the crank arm about the axis in the first rotary direction to rotate the auxiliary rotary switch;

a connection-state link in the circuit breaker, having an aperture in the connection-state link with an edge configured to contact a crank pin mounted on the crank arm at the end opposite to the axis of the crank arm, the crank pin configured to apply a force to the edge of the aperture of the connection-state link in response to the spring bias of the crank spring;

wherein the connection-state link contacts a drive link coupled to main contacts of the circuit breaker, the drive link configured to move the connection-state link in response to closure of the main contacts of the circuit breaker, to thereby reduce the force applied by the crank pin to the edge of the aperture of the connection-state link and enable the crank arm to impart the rotary motion to the crank arm about the axis in the first rotary direction to rotate the auxiliary rotary switch corresponding to the closure of the main contacts of the circuit breaker; and wherein the limit stop is configured to limit the rotation of the crank arm in the first rotary direction to the rotation limit while the edge of the aperture of the connection-state link continues to move and to cause the edge of the aperture in the connection-state link to cease contact with the crank pin mounted on the crank arm, to thereby decouple the connection-state link from the crank arm, to relieve the crank arm of forces from the drive link resulting from the main contacts of the circuit breaker closing.

13. The circuit breaker of claim 12, further comprising:

a return spring in the circuit breaker connected to the connection-state link, the return spring having a spring bias configured to apply a second force to the connection-state link;

wherein, when the edge of the aperture of the connection-state link is in contact with the crank pin mounted on the crank arm, the edge is configured to apply the second force to the crank pin to maintain the connection-state link in contact with the drive link in response to closure of the main contacts of the circuit breaker.

14. The circuit breaker of claim 13, further comprising:

wherein, the drive link is configured to not contact the connection-state link in response to opening of the main contacts of the circuit breaker, and the second force of the return spring on the connection-state link is configured to cause the edge of the aperture of the connection-state link to force the crank pin to impart a rotary motion to the crank arm about the axis in a second rotary direction opposite to the first rotary direction to rotate the auxiliary rotary switch corresponding to the opening of the main contacts of the circuit breaker.

15. The circuit breaker of claim 14, further comprising:

wherein, the second force of the return spring and weight of the connection-state link have a combined force that is applied by the edge of the aperture of the connection-state link to the crank pin, which is greater than the force of the crank spring applied to the crank pin, to impart the rotary motion to the crank arm about the axis in the second rotary direction corresponding to the opening of the main contacts of the circuit breaker.

16. The circuit breaker of claim 15, further comprising:

wherein, while the main contacts are closed, a holding link coupled to the main contacts is configured to support the connection-state link against the second force of the return spring;

wherein, when the main contacts begin opening, the holding link is configured to remove the support to the connection-state link against the force of the return spring; and wherein, the connection-state link in response to the second force of the return spring, is configured to pull the crank arm and impart a rotary motion to the crank arm about the axis in the second rotary direction opposite to the first rotary direction to rotate the auxiliary rotary switch corresponding to the opening of the main contacts of the circuit breaker.

17. The circuit breaker of claim 16, further comprising:

wherein, when the main contacts of the circuit breaker open, the edge of the aperture of the connection-state link pushes against the crank pin of the crank arm as the crank arm moves in the second rotary direction; and a stop pin is configured to limit the rotation of the crank arm in the second rotary direction, which resets the electrical connections in the auxiliary rotary switch corresponding to the circuit breaker contacts opening.

* * * * *